Dec. 6, 1966  L. R. HUBBARD  3,290,589
DEVICE FOR MEASURING AND INDICATING CHANGES
IN RESISTANCE OF A LIVING BODY
Filed June 7, 1965  2 Sheets-Sheet 1

INVENTOR.
LAFAYETTE R. HUBBARD
BY
Christian R. Nielsen
ATTORNEY

Dec. 6, 1966   L. R. HUBBARD   3,290,589
DEVICE FOR MEASURING AND INDICATING CHANGES
IN RESISTANCE OF A LIVING BODY
Filed June 7, 1965   2 Sheets-Sheet 2

INVENTOR.
LAFAYETTE R. HUBBARD
BY
Christian R. Nielsen
ATTORNEY

United States Patent Office 3,290,589
Patented Dec. 6, 1966

1

3,290,589
DEVICE FOR MEASURING AND INDICATING CHANGES IN RESISTANCE OF A LIVING BODY
Lafayette R. Hubbard, Saint Hill Manor, East Grinstead, England
Filed June 7, 1965, Ser. No. 465,246
1 Claim. (Cl. 324—62)

This is a continuation-in-part of my application Serial No. 82,100, filed Jan. 11, 1961 and now abandoned, for "Resistance Measuring or Indicating Devices."

This invention relates to resistance measuring or indicating devices and is concerned more especially, but not exclusively, with devices for indicating variations in the electrical resistance of the human body.

In accordance with the invention there is provided an electrical resistance measuring or indicating device comprising a bridge network having on one side thereof a first resistance arm connected to a second resistance arm and on the other side thereof, a first voltage arm connected to a second voltage arm, there being between the junction of the first and second resistance arms and the junction of the first and second arms, a transistorized amplifier circuit and indicating means responsive to changes in balance of the bridge network so as to indicate or measure the resistance, or variations in resistance, of a subject such as a body or part connected to the network across one of said resistance arms.

In a preferred form of the device, a first variable potentiometer means is associated with one of the voltage arms for controlling the range over which the device can operate in the indication of variations in resistance and a second variable potentiometer means is arranged between the junction of the first and second resistance arms and the amplifier circuit, the arrangement being such that when the bridge network becomes unbalanced by the application of a subject thereto, balance can be restored by the adjustment of the first poteniometer means so that the indicating means will respond to very small changes in resistance of said subject.

For a better understanding of the invention and the method by which it is to be performed, an embodiment thereof is shown in the accompanying drawings, wherein, FIGURE 1 is a schematic diagram illustrating the basic circuit of a resistance measuring or indicating device.

Figure 1:
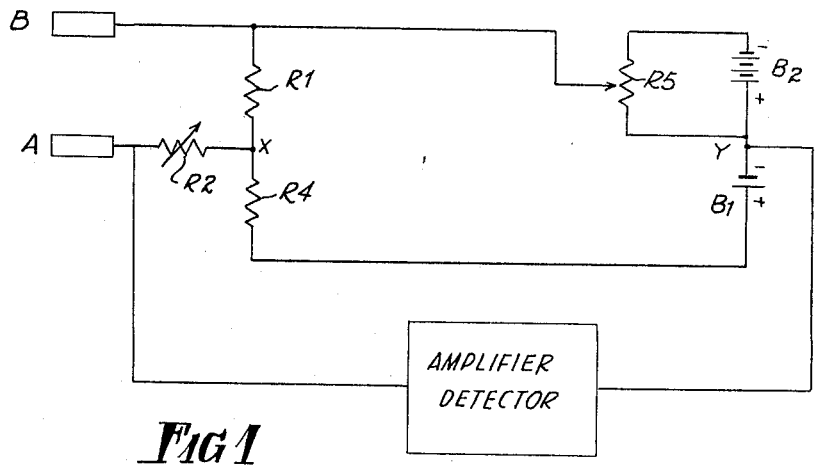

Referring to FIGURE 1, the device comprises a network arranged to provide what may be termed a "voltage ratio-arm" bridge comprising on one side two resistance arms constituted respectively by resistors R1 and R4 which form a potential divider adjusted to a ratio of 4:1. The other side of the bridge network comprises one voltage arm formed by a 1.5 volt battery indicated at B1 and a second voltage arm consisting of a 6 volt battery indicated at B2 and across which there is provided a range control consisting of a variable potentiometer R5. Electrode terminals are provided at A and B for the connection of the network to the body of a human subject, terminal A being connected through a preset 5K variable potentiometer R2 to the junction X of R1 and R4, and the terminal B being connected to the slider of R5 which, in the present embodiment comprises a 20K ohm linear potentiometer. Between the junction indicated at Y of battery B1 with B2 and the connection of terminal A to potentiometer R2, there is arranged a transistorized D.C. amplifier arranged to feed a moving coil meter for indicating the out-of-balance current of the bridge network. It will be clear that with an open circuit between the subject terminals A and B, the bridge will balance when the slider of potentiometer R5 is at the negative end of its travel.

Briefly, the operation of the device as described with reference to FIGURE 1 is that when the device is applied to the body of a human being, as by gripping of the terminal electrodes in the hands of the subject, the body resistance shunts the resistor R1 thereby unbalancing the bridge, or causing the degree of unbalanceof the bridge to change. Potentiometer R5 is then adjusted to restore balance to the bridge as indicated on the meter. The instrument then becomes very sensitive to changes in the body resistance of the subject, a very small change of such resistance causing a relatively large change in the deflection of the meter pointer.

Figure 3:
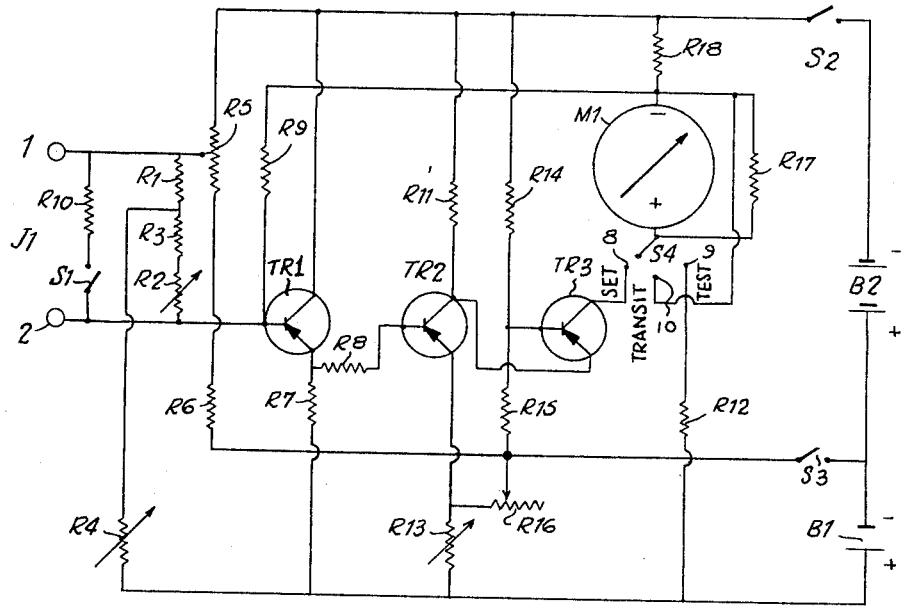
FIGURE 3 is another complete circuit diagram of the device.

Referring now to the circuit diagram of FIGURE 3, the D.C. amplifier comprises three transistors TR1, TR2 and TR3 which derive their operating power from the batteries B1 and B2, the transistors each consisting in the present embodiment, of a Mullard P-N-P type transistor 0C70. It will be noted that in FIGURE 3 the input to the D.C. amplifier is applied between the base and emitter of the first transistor TR1, the emitter of TR1 being returned through a 4.7K resistor R7 to the positive side of battery B1 whereas in FIGURE 1 the amplifier is shown as connected to junction Y of batteries B1 and B2. However, in FIGURE 3, the circuit is so adjusted that under balance conditions there is a potential difference of 1.5 volts across the load resistor R7. This potential difference is equal to the battery voltage so that the circuit behaves exactly as though it were indeed connected as a simple bridge in the manner shown in FIGURE 1.

Transistor TR1 of the input stage, is an emitter follower having a fairly high input resistance, it being necessary to keep the input resistance of the amplifier high relatively to the resistance of the bridge in order to prevent loading, since loading is particularly important when the bridge is operated in an unbalanced condition.

For the connection of the subject electrodes A and B to the instrument, there is provided a telephone jack J1 having spring contacts indicated diagrammatically at 1 and 2, adapted to be connected, upon insertion of an appropriately wired plug (not shown) to the electrodes A and B respectively. Contact 2 is connected to R2 and also to the base of the first transistor TR1. Contact 1 of the jack is connected to the slider of the range control potentiometer R5 and is also operatively associated with a single pole switch S1 in such a manner that when the plug is withdrawn, switch S1 closes to connect across the jack contacts 1 and 2, a 5K ohm resistor R10 in place of the subject's body. In the present embodiment, the resistance arms R1 and R4 of the bridge comprise resistors of 22K and 6.8 ohms respectively. The range control potentiometer R5 is connected at one end to the negative side of battery B2 through switch S2 and at the other end to the negative side of battery B1 through a 2.2K ohm resistor R6 and a switch S3. The base of transistor TR1 is also connected through resistor R9 to the negative side of meter M1 and the collector of transistor TR1 is connected through switch S2 to the negative side of battery B2. The emitter of TR1 is connected through a 470 ohm resistor R8 to the base of the second stage transistor TR2, the latter being arranged as a conventional common-emitter stage which provides most of the current gain. The emitter of TR2 is connected through a 5K ohm pre-set variable resistor R13 to the positive side of battery B1 and this emitter is also connected through a sensitivity control R16 comprising a 5K ohm reverse-log variable resistor, and through the switch S3 to the negative side of battery B1. The collector of TR2 is connected directly to the emitter of TR3, and is also connected through a 5.6K ohm resistor R11 and switch S2, to the negative side of battery B2. The base of TR3 is connected to the junction of resistors R14 and R15, each of 22K ohms, R14 being connected through switch S2 to the negative side of battery B2 and R15 being connected to the slider of resistor R16. The collector of TR3 is connected to a contact 8 of switch S4 so that by operation of that switch the collector can be connected to the positive side of the meter. The meter is shunted by a 4.7K ohm resistor R17 and the negative side thereof is connected through 22K ohm resistor R18 and switch S2 to the negative side of the battery B2. The switch S4 has a contact 9 connected through 43K ohm resistor R12 to the positive side of battery B1, and a further contact 10 connected to the negative side of the meter to shunt the meter for transit purposes. The transistor TR3 of the output stage is connected in the common-base configuration and constitutes an impedance matching device feeding the indicating meter.

The resistor R9 is a negative-feed back resistor which helps stabilize the overall gain. Its value depends upon the type of transistors used, as follows:

For Beta of 50 to 150, R9 will have a resistance of 1 megohm.

For Beta of 30, R9 will have a resistance of 2.2 megohms.

For Beta of 10 to 20, R9 will be open circuit.

Figure 4:
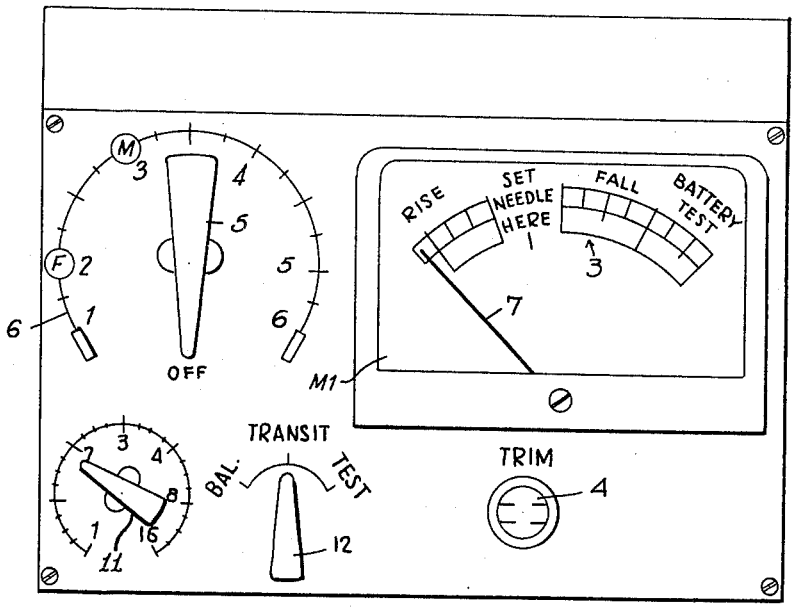
FIGURE 4 is a front view of the device.

The switches S2 and S3 are the main on-off switches and are conveniently formed by a double-pole on-off switch ganged to the range control R5. Switch S4 is a single-pole treble throw switch operated by knob 12 (FIGURE 4).

The indicating meter M1 is a moving-coil meter capable of reading from 0 to 100 microamps at full scale deflection, the meter having an arcuate scale 3 (FIGURE 4) divided into sections. At about one-third scale deflection, there is provided a small sector of the arc marked "SET NEEDLE HERE." At the full-scale end of the arc there is another small sector marked "Battery Test." Between these two small sectors, the scale is colored red and marked "FALL." The portion of the scale below the "SET NEEDLE HERE" sector, is colored green and marked "RISE." The 51 ohm pre-set variable resistor R2 is provided between the subject terminals and the amplifier detector, to permit compensation for variations in component values. The resistance value of the optimum female subject is 5K ohms and the instrument is therefore standardized at this value. For the setting of R2, there is provided a control 4 (FIGURE 4) marked "TRIM."

The range control potentiometer R5 has a control knob 5 and a linear scale 6 marked from "1" to "6" and extending over an arc of 240°, which is divided into divisions of 48°. In the initial adjustment of the instrument, R2 is adjusted in such a manner that when the input jack plug is withdrawn, and the 5K ohm resistor R10 is thus connected across the input, a balance is established when the range control R5 is set to "2" on its scale. When this adjustment has been made, the balance point should be at "3" on the range control scale 6 of R5 with a resistance of 12,500 ohms connected across the input. Thus when the instrument is correctly adjusted the meter pointer 7 should indicate the center of the "SET NEEDLE HERE" sector of the scale when the control 5 of R5 is set to read "2" on its scale. In order to set up the calibration it is merely necessary to set the control 5 to "2," withdraw the plug of the jack J1 and adjust R2 by means of the control 4 to bring the meter pointer to the correct deflection.

With the body of a subject connected to the electrodes A and B, and the range control R5 adjusted for balance, a fall in the resistance of subject's body will cause the base current of transistor TR1 to change in a negative direction. This increases the current in R7 so that the base of TR2 is also carried negative. This, in turn, makes the emitter of TR3 more positive. The collector current of TR3 then increases and thereby increases the deflection of the meter pointer. If, on the other hand, the body resistance of the subject increases, the base current of TR1 will change in a positive direction and there will be a consequential reduction in the deflection of the meter pointer.

When the bridge is in a balanced condition, there will be 1.5 volts applied to the base of TR1 and the meter pointer 7 should indicate the center of the "SET NEEDLE HERE" sector of the scale. The amplifier should be so adjusted that this becomes a virtual zero condition. That is to say, when this condition prevails, variation of amplifier gain should not alter the meter reading. If, however, there is unbalanced voltage such that the meter indication is above or below this virtual zero reading, an increase in gain will move the pointer further above or below the zero condition, as the case may be.

The gain of the amplifier is adjusted by means of the knob 11 (FIGURE 4) of the sensitivity control R16 which varies the negative feedback applied to transistor TR2, part of the emitter current of TR2 flowing through R16 and part through the pre-set variable resistor R13. The latter is adjusted to such a value that, when the meter pointer is at the center of the "SET NEEDLE HERE" sector of the scale, the voltage drop across it is just equal to the battery voltage; thus, for this reading and for this reading only, no current flows in R16 and its setting does not affect the indication of the meter.

Because the instrument is primarily intended for the detection of changes in the body resistance of a human subject, precautions must be taken to minimize changes in the meter deflection due to other causes. Changes due to unstable or noisy transistors are overcome by careful selection of transistors, but a change in gain with change in temperature, which is one of the fundamental characteristics of all transistors, can give rise to a steady drift which may be misleading. To correct for this type of instability, the transistor TR3 is introduced between B1 and B2 and across transistor TR2. The emitter of transistor TR3 is connected to the collector of transistor TR2; therefore a voltage drift on the collector of transistor TR2 will produce a compensating voltage change on the emitter of transistor TR3. Thus, transistor TR1 is an emitter follower whose output is delivered to the base of transistor TR2 through resistor R8. The emitter of TR2 receives bias voltage at the junction of resistors R13 and R16, adjusted by means of R16. The base of transistor TR3 receives bias voltage at the junction of resistors R14 and R15. The output current of the amplifier flows from the collector of TR3 through the indicating meter M1 with compensation for voltage drift provided by the interconnection of the collector of TR2 and the emitter of TR3, as above described.

Figure 2:
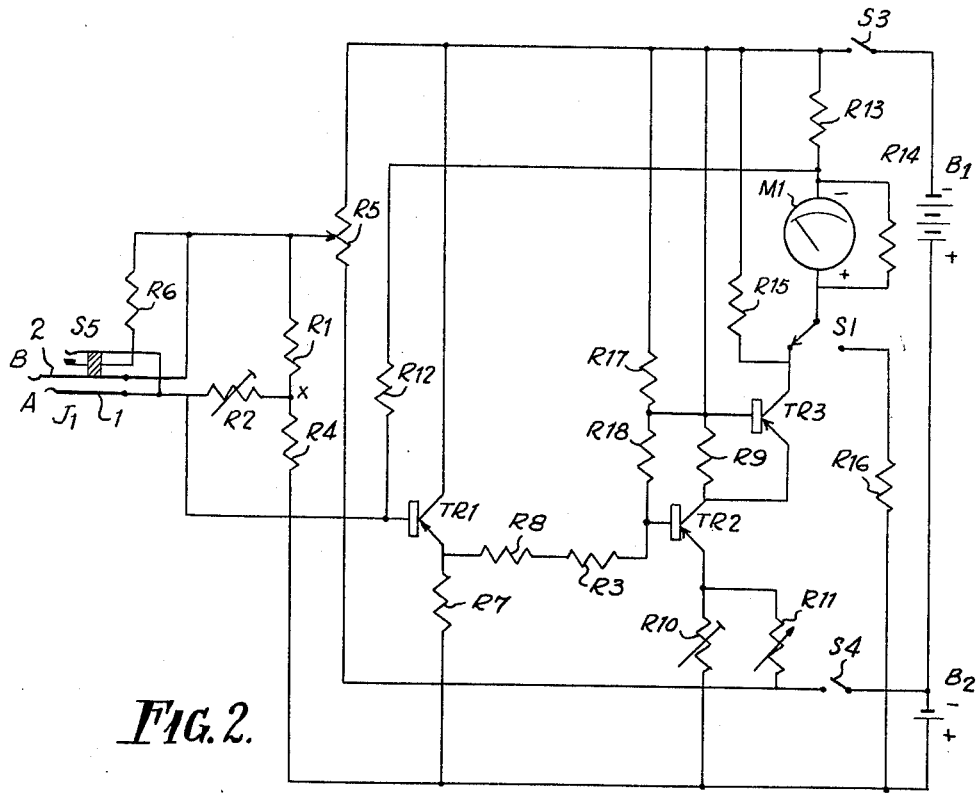
FIGURE 2 is a complete circuit diagram thereof.

In the circuit of FIGURE 2, the collector of transistor TR2 is also connected to the emitter of transistor TR3, providing the same type of drift compensation. Here again, the transistor TR1 is an emitter follower whose output is delivered to the base of transistor TR2 through resistors R8 and R3.

In both FIGURES 2 and 3, the first stage of the amplifier is an emitter follower and the second and third stages are cascaded in a manner to provide drift compensation, as above described.

When the switch S4, operated by the knob 12, is turned into its fully clock-wise position to disconnect the meter from the amplifier, it operates to place the resistors R18 and R12 across the battery. With the switch S4 in this position, a deflection of the meter scale to the "BATTERY TEST" sector is obtained only when the batteries are delivering their correct voltage. Turning the switch S4 in an anti-clockwise direction will, of course, operate it to connect the meter to the amplifier, whilst its central position is used for transit purposes only.

It will be understood that the component values indicated above are given purely by way of example, and may be modified as required, according to the nature of the transistors and the particular form of circuit described, As previously indicated, the device hereinbefore described, is intended more particularly for use in indicating changes in the body resistance of a human subject, but here again, the circuit and the components thereof may be modified according to the particular use of the device.

What is claimed is:

In a resistance measuring and indicating device, a bridge network having on one side thereof a first resistance arm connected in series with a second resistance arm, and on the other side thereof a first voltage arm connected in series with a second voltage arm, there being connected in series between the junction of the first and second resistance arms and the junction of the voltage arms a transistorized amplifier circuit and current indicating means showing changes in balance of the bridge network, two electrode means adapted to be connected to a living body, said electrode means being connected respectively to the terminals of one of said resistance arms, whereby the living body can be connected across said one of the resistance arms, a range control comprising a potentiometer connected across said first voltage arm, said potentiometer having a sliding contact connected to the bridge network, one of said electrode means being connected to said sliding contact, a variable resistance connected between the other electrode means and the junction of the first and second resistance arms, said variable resistance being adjustable to enable a balance to be established in the initial setting of the bridge network, said amplifier circuit comprising a transistor emitter follower and cascaded second and third transistors connected to the output of the emitter follower, the collector of the second transistor being connected to the emitter of the third transistor, whereby to provide voltage drift compensation, the indicating means comprising a moving coil meter connected in circuit with the collector of the third transistor and the first voltage arm, a sensitivity control branch connected across the second voltage arm and comprising two series-connected resistors, at least one of which is variable, the junction of said last-named resistors being connected directly to the emitter of the second transistor, said other electrode means being connected directly to the base of the transistor emitter follower, and a resistive negative feedback branch connecting the output of the amplifier to the base of the transistor emitter follower.

References Cited by the Examiner

UNITED STATES PATENTS 2,504,965  4/1950  Davis.
2,649,571  8/1953  Smith _____ 324—62

OTHER REFERENCES

Schuster, D.: "D.-C. Transistor Amplifier," Electronics, Engineering edition, Feb. 28, 1958, pp. 64–65.

WALTER L. CARLSON, *Primary Examiner.*

W. H. BUCKLER, *Assistant Examiner.*